(12) United States Patent
Xiao et al.

(10) Patent No.: US 8,676,807 B2
(45) Date of Patent: Mar. 18, 2014

(54) IDENTIFYING LOCATION NAMES WITHIN DOCUMENT TEXT

(75) Inventors: Rong Xiao, Beijing (CN); Jiangming Yang, Beijing (CN); Lei Zhang, Beijing (CN); Xingrong Chen, Macau (CN)

(73) Assignee: Microsoft Corporation, Redmond, WA (US)

( * ) Notice: Subject to any disclaimer, the term of this patent is extended or adjusted under 35 U.S.C. 154(b) by 158 days.

(21) Appl. No.: 12/764,989

(22) Filed: Apr. 22, 2010

(65) Prior Publication Data

US 2011/0264664 A1   Oct. 27, 2011

(51) Int. Cl.
  *G06F 7/00* (2006.01)
  *G06F 17/30* (2006.01)

(52) U.S. Cl.
  USPC .......... 707/741; 707/730; 707/749; 382/224; 382/113; 701/431

(58) Field of Classification Search
  None
  See application file for complete search history.

(56) References Cited

U.S. PATENT DOCUMENTS

| | | | |
|---|---|---|---|
| 6,182,008 B1 | 1/2001 | Nikiel et al. |
| 6,321,158 B1 | 11/2001 | DeLorme et al. |
| 7,379,811 B2 | 5/2008 | Rasmussen et al. |
| 7,463,976 B2 | 12/2008 | Nomura |
| 7,472,338 B2 | 12/2008 | Carro |
| 7,475,010 B2 | 1/2009 | Chao |
| 7,548,915 B2 | 6/2009 | Ramer et al. |
| 7,698,332 B2 | 4/2010 | Liu et al. |
| 7,734,641 B2 | 6/2010 | Kanigsberg |
| 7,788,134 B1 | 8/2010 | Manber et al. |
| 7,826,965 B2 | 11/2010 | Sadri et al. |
| 8,095,303 B1 | 1/2012 | Nesbitt et al. |
| 2002/0128767 A1 | 9/2002 | Cardno et al. |
| 2002/0143490 A1 | 10/2002 | Maeda et al. |
| 2003/0093217 A1 | 5/2003 | Petzold et al. |
| 2004/0059708 A1 | 3/2004 | Dean et al. |
| 2005/0216464 A1 | 9/2005 | Toyama et al. |
| 2005/0234991 A1 | 10/2005 | Marx et al. |
| 2005/0278378 A1 | 12/2005 | Frank |
| 2006/0047690 A1* | 3/2006 | Humphreys et al. .......... 707/102 |
| 2006/0230033 A1* | 10/2006 | Halevy et al. ..................... 707/3 |
| 2007/0005419 A1 | 1/2007 | Horvitz et al. |
| 2007/0010942 A1 | 1/2007 | Bill |
| 2007/0150188 A1 | 6/2007 | Rosenberg |
| 2007/0179863 A1 | 8/2007 | Stoll |
| 2007/0198182 A1 | 8/2007 | Singh |

(Continued)

OTHER PUBLICATIONS

Cucerzan Silviu, "Large-Scale Named Entity Disambiguation Based on Wikipedia Data",Retrieved at<<http://acl.ldc.upenn.edu/D/D07/D07-1074.pdf>>, Jun. 2007, pp. 708-716.

(Continued)

*Primary Examiner* — Dung K Chau
(74) *Attorney, Agent, or Firm* — Carole Boelitz; Leonard Smith; Micky Minhas (57) ABSTRACT

Concepts and technologies are described herein for identifying location names within document text. Through an implementation of the concepts and technologies presented herein, functionality can be provided for identifying location names within articles, websites, travelogues, or other such documents. For instance, documents containing the names of cities, regions, countries, landmarks, or other locations may be associated with those locations. The location names may be unambiguously identified even when the location names may also have common word meanings that are not location associated or when the location name may be associated with more than one location.

13 Claims, 6 Drawing Sheets

(56) References Cited

U.S. PATENT DOCUMENTS

| | | | |
|---|---|---|---|
| 2007/0219968 A1 | 9/2007 | Frank | |
| 2008/0010605 A1 | 1/2008 | Frank | |
| 2008/0033903 A1* | 2/2008 | Carol et al. | 707/1 |
| 2008/0082578 A1 | 4/2008 | Hogue et al. | |
| 2008/0086468 A1 | 4/2008 | Jing et al. | |
| 2008/0086686 A1 | 4/2008 | Jing et al. | |
| 2008/0125969 A1* | 5/2008 | Chen et al. | 701/211 |
| 2008/0319974 A1 | 12/2008 | Ma et al. | |
| 2009/0005981 A1 | 1/2009 | Forstall et al. | |
| 2009/0019066 A1* | 1/2009 | Wang et al. | 707/100 |
| 2009/0070298 A1 | 3/2009 | Hadzima et al. | |
| 2009/0119255 A1* | 5/2009 | Frank et al. | 707/3 |
| 2009/0156229 A1 | 6/2009 | Hein et al. | |
| 2009/0303036 A1 | 12/2009 | Sahuguet | |
| 2010/0179754 A1 | 7/2010 | Faenger et al. | |
| 2011/0072025 A1 | 3/2011 | van Zwol et al. | |
| 2011/0077848 A1 | 3/2011 | Xiao et al. | |
| 2011/0078139 A1 | 3/2011 | Xiao et al. | |
| 2011/0078575 A1 | 3/2011 | Xiao et al. | |
| 2011/0145235 A1* | 6/2011 | Lei et al. | 707/730 |
| 2011/0252025 A1 | 10/2011 | Jin et al. | |
| 2011/0264655 A1 | 10/2011 | Xiao et al. | |
| 2011/0271232 A1 | 11/2011 | Crochet et al. | |

OTHER PUBLICATIONS

Hassell IV, Joseph Edward, "Ontology-Driven Automatic Entity Disambiguation in Unstructured Text", Retrieved at<<http://webster.cs.uga.edu/~budak/papers/JedThesis.pdf>>, Nov. 9, 2006, pp. 96.
Silva, et al., "Adding Geographic Scopes to Web Resources", Retrieved at<< http://www.geo.uzh.ch/~rsp/gir/abstracts/silvia.pdf>>, May 4, 2006, pp. 3.
Wang, et al., "Detecting Dominant Locations from Search Queries", Retrieved at<<http://research.microsoft.com/en-us/people/xingx/QLD.pdf>>, Aug. 2005, pp. 8.
Wang, et al., "Application-Driven Web Resource Location Classification and Detection", Retrieved at<<ftp://ftp.research.microsoft.com/pub/TR/TR-2005-32.pdf>>, Mar. 2005, pp. 10.
Pouliquen, et al., "Geographical Information Recognition and Visualisation in Texts Written in Various Languages", Retrieved at<<http://langtech.jrc.it//Documents/ACM-SAC-2004_Pouliquen-Steinberger-et-al.pdf>>, 2004, pp. 8.
Sundheim Beth, "Resources to Facilitate Progress in Place Name Identification and Reference Resolution", Retrieved at<<http://delivery.acm.org/10.1145/1290000/1289219/p319-sundheim.pdf?key1=1289219&key2=5029991621&coll=GUIDE&dl=GUIDE&CFID=70055055&CFTOKEN=49468002>>, 2002, pp. 6.
U.S. Notice of Allowance dated May 23, 2012 in U.S. Appl. No. 12/568,725.
U.S. Official Action dated Dec. 19, 2011 in U.S. Appl. No. 12/568,735.
U.S. Notice of Allowance dated May 23, 2012 in U.S. Appl. No. 12/567,735.
U.S. Official Action dated Mar. 26, 2012 in U.S. Appl. No. 12/568,749.
U.S. Official Action dated Mar. 30, 2012 in U.S. Appl. No. 12/764,977.
"BootsnAll," Retrieved Aug. 7, 2009 from http://www.bootsnall.com, 2 pages.
"Embed Google Maps on your Website or Blog," Sep. 5, 2007, Retrieved from http://www.labnol.org/internet/blogging/embed-google-maps-on-your-website-or-blog/1316/, 1 page.
"Expedia," Retrieved Aug. 7, 2009 from http://www.expedia.com, 2 pages.
Free Geography Tools, Jul. 19, 2007, pp. 1-10.
"Geographic Information System," Wikipedia, Retrieved Aug. 6, 2009 from http://en.wikipedia.org/wiki/GIS, 18 pages.
"GeoSense Mobility Complete Mobile Workforce Management Platform," Retrieved Aug. 11, 2009 from http://enovia.ca/site/GeoSenseMobility.php, pp. 3.
"Getjealous," Retrieved Aug. 7, 2009 at http://www.getjealous.com, 2 pages.
"Inserting HTML Code into your Web Site, " Retrieved Aug. 11, 2009 from http://office.microsoft.com/en-us/officelive/FX102223081033.aspx?mode=print, 6 pages.
"Microsoft Streets & Trips 2001 Planning a Road Trip," 2001, Retrieved Aug. 6, 2009 from http://www.webjunction.org/c/document_library/get_file?folderId=431408&name=DLFE-10121.pdf, Lesson 16, pp. 147-154.
"Realtravel," Retrieved Aug. 7, 2009 from http://www.realtravel.com, 3 pages.
"Road Trip," Retrieved Aug. 6, 2009 from http://download.microsoft.com/download/2/4/b/24bb8c05-8bd4-4cac-89ff-0901bf3b8468/RoadTrip.doc, 1 Page.
"Shortest Path Problem," Wikipedia, Retrieved Aug. 7, 2009 from http://en.wikipedia.org/wiki/Shortest_path, 4 pages.
"Travelblog," Retrieved Aug. 7, 2009 from http://www.travelblog.org, 4 pages.
"Traveljournals," Retrieved Aug. 7, 2009 from http://www.traveljournals.net, 1 page.
"Travelogue," Retrieved Aug. 6, 2009 from http://sourceforge.net/projects/travelogue/, 1 page.
"Travelling Salesman Problem," Wikipedia, Retrieved Aug. 7, 2009 from http://en.wikipedia.org/wiki/Traveling_salesman_problem, 8 pages.
"Travelpod," Retrieved Aug. 7, 2009 from http://www.travelpod.com, 4 pages.
"Travelpost," Retrieved Aug. 7, 2009 from http://www.travelpost.com, 1 page.
"Web User Experience," Retrieved Aug. 11, 2009 from http://research.microsoft.com/en-us/projects/wue/, 2 pages.
"Yahoo! Placemaker™ Beta," Retrieved Sep. 23, 2009 from http://developer.yahoo.com/geo/placemaker/, 2 pages.
Amitay et al., "Web-a-Where: Geotagging Web Content," Jul. 25-29, 2004, *Proceedings of SIGIR '04*, Sheffield, South Yorkshire, UK, pp. 273-280.
Ardissono et al. "Tailoring the Recommendation of Tourist Information to Heterogeneous User Groups," 2002, *Proceedings, Revised Papers from the International Workshops OHS-7, SC-3, and AH-3 on Hypermedia: Openness, Structural Awareness, and Adaptivity*, pp. 280-295.
Brunato et al., "A Location-dependent Recommender System for the Web," 2002, *Technical Report DIT-02-093, Ingengneria e Scienca dell'Informazione*, University of Trento, Italy, 5 pages.
Jing et al., "VirtualTour: An Online Travel Assistant Based on High Quality Images," Oct. 23-27, 2006, MM'06, SantaBarara, California, 4 pages.
Leidner et al., "Grounding Spatial Named Entities for Information Extraction and Question Answering," 2003, *Proceedings of the HLT-NAACL 2003 Workshop on Analysis of Geographic References*—vol. 1, pp. 31-38.
Li et al.,"Infoxtract Location Normalization: A Hybrid Approach to Geographic References in Information Extraction," 2003, *Proceedings of the HLT-NAACL 2003 Workshop on Analysis of Geographic References*, vol. 1, pp. 39-44.
Li et al., "Location Normalization for Information Extraction," 2002, *Proceedings of the 19th Int'l Conference on Computational Linguistics*, vol. 1, pp. 1-7.
Ma et al., "A Localness—Filter for Searched Web Pages", 2003. *Lecture Notes in Computer Science*. vol. 2642/2003, pp. 525-536.
Martens, "On Usability of Web Services," Dec. 13, 2003, *Proceedings of 4th Int'l Conference on Web Information Systems Engineering Workshops*, pp. 182-190.
McCurley, "Geospatial Mapping and Navigation of the Web," May 1-5, 2001, *Proceedings of WWW10*, Hong Kong, pp. 221-229.
Mior, "Rapid Prototyping of a Mobile Location-based Tour," Dec. 12, 2008, Thesis, University of Ontario Institute of Technology, 22 pages.
Moxley, "SpiritTagger: A Geo-Aware Tag Suggestion Tool Mined from Flickr," 2008, pp. 24-30.
Overell et al., "Geographic Co-occurrence as a Tool for GIR," Nov. 9, 2007, *ACM*, 6 pages.

(56) References Cited

OTHER PUBLICATIONS

Park et al., "Location-based Recommendation System Using Bayesian User's Preference Model in Mobile Devices," 2007, *Lecture Notes in Computer Science*, vol. 4611/2007, pp. 1130-1139.

Rauch et al., "A Confidence-Based Framework for Disambiguating Geographic Terms," 2003, *Proceedings of the HLT-NAACL 2003 Workshop on Analysis of Geographic References*—vol. 1, pp. 50-54.

Ricci, "Travel Recommender Systems," Nov./Dec. 2002, *IEEE Intelligent Systems*, 17(6): 55-57.

Rogers, et al., "An Adaptive Interactive Agent for Route Advice," 1999, *Proceedings of the third annual conference on Autonomous Agents*, pp. 198-205.

Takeuchi et al., "An Outdoor Recommendation System based on User Location History," 2005, ubiPCMM, 10 pages.

Wang et al., "Detecting Geographic Locations from Web Resources," Nov. 4, 2005, *Proceedings of GIR '05*, Bremen, Germany, pp. 17-24.

Wang et al., "Web Resource Geographic Location Classification and Detection," May 10-15, 2005, *Proceedings of WWW* 2005, Chiba, Japan, pp. 1138-1139.

Zheng et al., "Mining Interesting Locations and Travel Sequences from GPS Trajectories," Apr. 20-24, 2009, *Proceedings of the 18th Int'l Conference on World Wide Web*, Madrid, Spain, pp. 791-800.

U.S. Official Action dated Aug. 15, 2012 U.S. Appl. No. 12/764,977.

U.S. Official Action dated Dec. 13, 2012 in U.S. Appl. No. 12/568,749.

U.S. Official Action dated Feb. 26, 2013 in U.S. Appl. No. 12/764,977.

U.S. Notice of Allowance dated Jun. 25, 2013 in U.S. Appl. No. 12/764,977.

\* cited by examiner

IDENTIFYING LOCATION NAMES WITHIN DOCUMENT TEXT

BACKGROUND

Identifying location names within documents can establish an association between the documents and the locations. For example, when information related to the location is sought, the associated document, or information from the document, may be provided. There is a rich body of documents that may provide information associated with a location. For example, travelogues are textual descriptions of a person's experience with a particular location. For instance, a person might travel to New York City and write a travelogue that describes their travel experience.

Travelogues are currently written and shared in a variety of different scenarios on the Internet. For instance, travelogues can be shared by way of World Wide Web (Web) sites, Web forums, Web logs (blogs), social networking sites, and in myriad other ways. A large number of such sites are currently available on the Internet for writing and sharing travelogues. This large number of disparate sites containing travelogues and similar documents often proves troublesome to users or automated search mechanisms attempting to identify locations within the documents in a precise and unambiguous fashion.

It is with respect to these and other considerations that the disclosure made herein is presented.

SUMMARY

Concepts and technologies are described herein for identifying location names within document text. Through an implementation of the concepts and technologies presented herein, functionality can be provided for identifying location names within articles, websites, travelogues, or other such documents. For instance, documents containing the names of cities, regions, countries, landmarks, or other locations may be associated with those locations. The location names may be unambiguously identified even when the location names may also have common word meanings that are not location associated or when the location name may be associated with more than one location.

According to one aspect presented herein, a word or phrase may be identified as either a location name or a common word. This differentiation may be referred to here as location detection. Location detection can use prior knowledge of the probability of a word being a location name or else being a common word that is not location associated. These probabilities may be collected from a corpus of many documents or articles.

According to another aspect presented herein, a location name that may be associated with several geographic locations may be disambiguated to only the intended location instance. This disambiguation may be referred to here as location recognition. Location recognition may predict the intended location instance of a location name using hints from other location names occurring within the same document.

According to yet another aspect presented herein, results from location recognition may be used to validate results from location detection. For example, if several location names are found near a word W within a document, it is more likely that the word W is a location name than a common word. The two operations of location detection and location recognition may be coupled with one another to extract or identify location names from textual content.

It should be appreciated that the above-described subject matter might also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for identifying location names within document text. The technology presented herein can support geographical term search related to location and travel information with improved efficacy in comparison to tradition keyword searches. The focus on location oriented documents can support services while a keyword search on such documents may fail at certain location oriented searches. Traditional keyword searches generally attach no special meaning to location words and therefore may miss cues, clues, and other indicators of implied informational content. For example, when searching for Central Park in New York, one can search for "New York" and "Central Park." However, if a document about Central Park does not mention New York or only does for a small number of terms, then that document may have a low relevance to the query for "New York" and "Central Park" while using a traditional keyword based search engine. In contrast, the technology presented herein can identify the term "Central Park" as being a park in New York thereby increasing the relevance of the document to the search even when the document does not explicitly mention New York.

Another example of a weakness in traditional keyword based searching occurs when a query term has strong ambiguity as both a geographical term and a common term. One such term is "mobile" being a location name for city in Alabama and also related to an ability to move or relating to wireless communications. Due to the additional common word, or non-geographical meanings, a traditional keyword based search engine will generally return extra irrelevant results. These extra results may be associated with the non-location senses of the term.

Yet another example of a weakness in traditional keyword based searching is encountered when integrating travel, or location, related services to keyword based search engines. For example, it may be an added difficulty for a traditional keyword based search engine to recommend popular photos related to a location name supplied by a user. However, the technology presented herein supports attaching a geographical meaning to a location word which can then relate photos, or other resources, to that geographical meaning. For example, if user queries photos for Central Park, photos from the Central Park in New York City may be automatically associated in response.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for identifying location names within document text will be presented.

Figure 1:
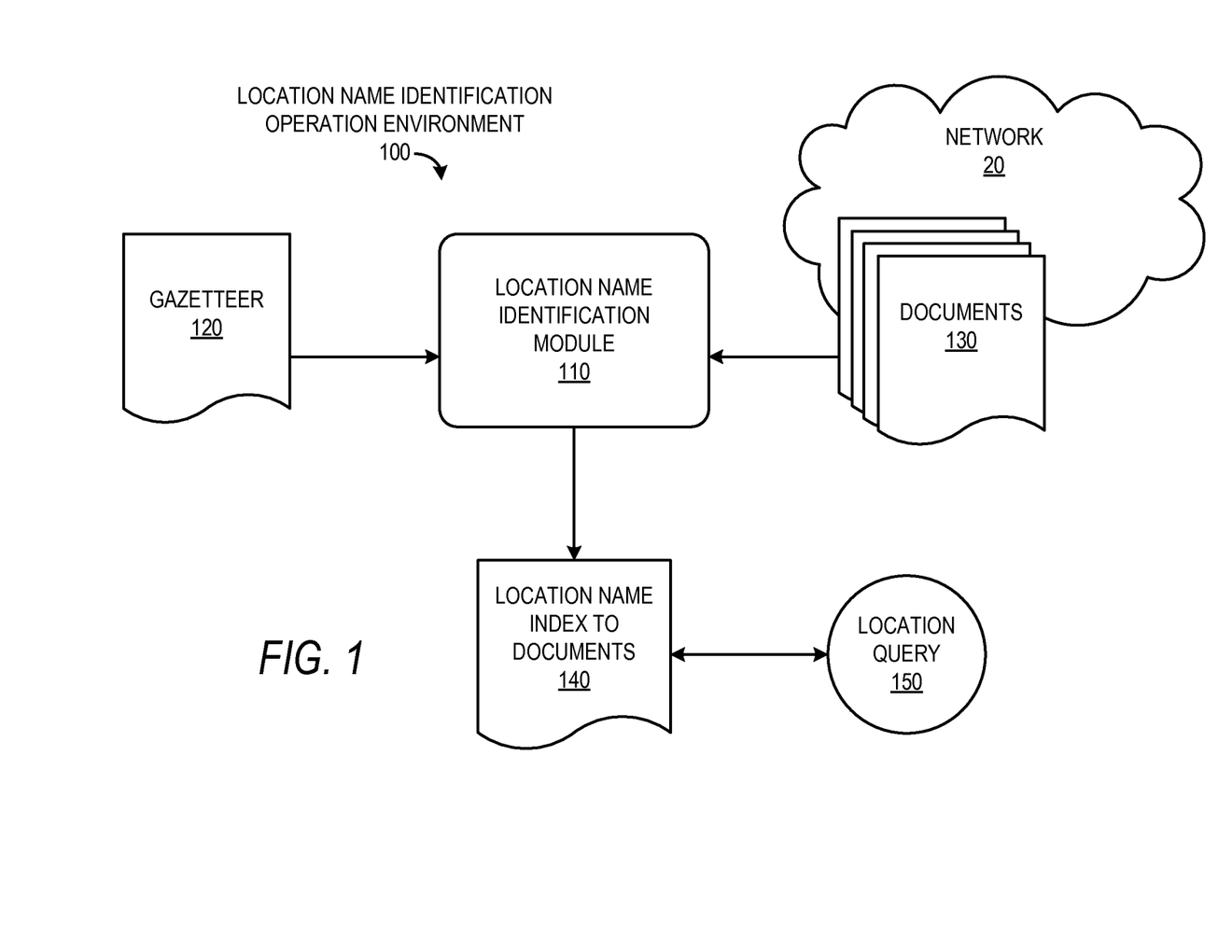
FIG. 1 is a system diagram illustrating aspects of one operating environment for the various embodiments presented herein.

Referring now to FIG. 1, aspects of one operating environment for the various embodiments presented herein will be described. A location name identification module 110 can identify location names within one or more documents 130. The documents may be located on servers within a network 20. For example, the documents may be travel web sites, travel blogs, travelogues, or any other documents containing references to geographical locations. The location name identification module 110 may use a gazetteer 120 of location names to perform the location name identifications.

The identified location names may be used to construct a location name index 140. The location name index 140 may be used to search the documents 130 for location names. The location name index 140 may be searched by a location query 150. The location query 150 can identify which, if any, of the documents 130 contain, or relate to, a location name. For example, a subset of the documents 130 may contain references to Hawaii. This subset may be returned using a location query 150 for the location word "Hawaii" against the location name index 140. The location query 150 may originate from a user, a search engine, any other software module, or any information retrieval mechanism.

The gazetteer 120 used by the location name identification module 110 may be considered a geographical directory or dictionary. There may be millions, or more, of location names in the gazetteer 120. Each location name within the gazetteer 120 may have one or more location senses. A sense for a term may be considered a possible meaning or context for the term. The location senses may be listed in a hierarchical fashion. For example, the location name "Statue of Liberty" may have three location senses in the gazetteer 120. The first location sense being "Statue of Liberty," the second location sense being "New York/Statue of Liberty," and the third second location sense being "New York/New York/Statue of Liberty." Similarly, the location name "Flamingo" may have three location senses in the gazetteer 120. The first location sense being "Flamingo," the second location sense being "Florida/Monroe/Flamingo," and the third second location sense being "Florida/Orange/Flamingo."

Figure 2:
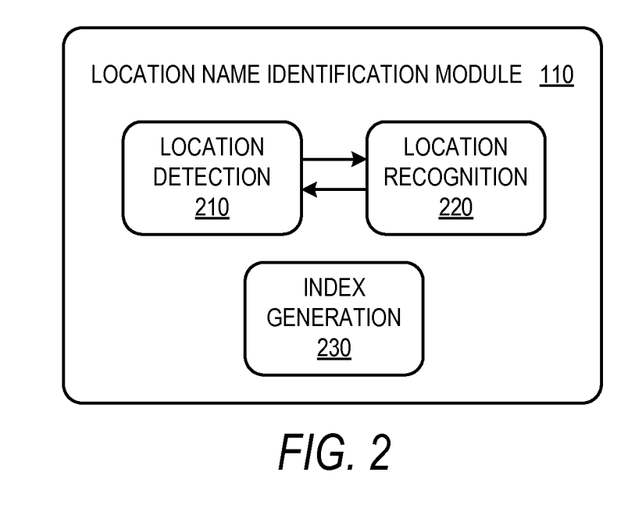
FIG. 2 is a software architecture diagram illustrating aspects of software components utilized in various embodiments presented herein.

Referring now to FIG. 2, a software architecture diagram showing aspects of software components utilized in various embodiments presented herein will be described. The location name identification module 110 can operate on one or more input documents 130, each denoted herein as $D_i$, to perform the interrelated tasks of location detection 210 and location recognition 220.

The task of location detection 210 can attempt to resolve the ambiguity between location senses of a term and non-location senses of the term, such as those associated with the term "mobile" as location name for a city in Alabama and a common word relating to being movable. Location detection 210 can employ the gazetteer 120 to find all possible location term candidates, as referred to herein as $X_{i,j}$, within document $D_i$ where i counts over documents and j counts over location terms within the documents. Where a term may be classified as either a location term, or not, without equivocation, the location detection 210 may be considered a binary classification problem. Such a problem may be approached using a binary support vector machine (SVM) model. An SVM can perform classification or regression using a set of supervised learning algorithms. For example, an SVM training algorithm may be taught using set of training examples where each example is associated with one of two categories. From this training, the SVM algorithm can build a model that predicts which of the two categories a newly encountered element belongs to.

The task of location recognition 220 can attempt to resolve the ambiguity between multiple location senses of a term, such as those associated with "Flamingo," a city name in Orange County, Florida and also a city name in Monroe County, Florida. The location disambiguation performed by location recognition 220 may be considered a ranking problem and may be approached using a rank SVM model. A score propagation approach may be used to resolve the ambiguities of location names as discussed in further detail with respect to FIG. 3.

Location detection 210 can disambiguate between geographical and non-geographical ambiguities. Similarly, location recognition 220 can disambiguate between geographical and geographical ambiguities. It should be appreciated that a location name may simultaneously have geographical/non-geographical ambiguity and also geographical/geographical ambiguity. For example "flamingo" has geographical/non-geographical ambiguity due to its non-location related sense relating to a type of bird. The term "flamingo" also has geographical/geographical ambiguity due to multiple cities in the state of Florida and numerous location senses related to the city of Las Vegas, Nev.

Location detection 210 and location recognition 220 can interrelate in an iterative fashion. While location recognition 220 may be based on the results from location detection 210, location detection 210 can then be improved by results from the location recognition 220. For example, the presence of the location name "Alabama" or other location names related to Alabama or Mobile, Ala. within a document can increase the likelihood that the word "mobile" within the document is the location name of a city and not a reference to the ability to move. Thus, resolving the location recognition 220 can assist the disambiguation between location words and common words in location detection 210.

Applying location detection 210 and location recognition 220 to a set of documents, or a corpus, a search index may be generated. Index generation 230 can provide a unique location sense for each identified location name. A corresponding focus score may also be provided. For example, each location name in a given document may be assigned a focus score as a measure of the location name's relevance to the given document. An inversion table may be generated according to location senses by relevance score. Thus, index generation 230 can provide a search index to support location sense based search. For example, if the query relates to "New York/New York/Central Park," a travel note about the Central Park of New York, N.Y. may be returned from searching the index.

The location name identification module 110 can also leverage conditional term probabilities for location names. For example, the term "mobile" has a higher probability of being a location name when conditioned upon the presence of the term "Alabama." The location name identification module 110 can also leverage popularity metrics from other information contexts. For example, location tags on photos within an online photo sharing system are significantly more numerous for "Paris, France" than for "Paris, Ill." This statistical information can serve as a proxy for the likelihood that a document containing the term "Paris" is related to France instead of being related to Illinois.

Yet another set of cues for location names within a text document includes grammatical unigrams and bigrams. A unigram involves a single word neighboring the term in question. For instance, "leaving" may be used as a prefix unigram to imply an increased likelihood of a location name. For example, in the text " . . . when they were leaving Miami . . . ," the single term "leaving" is a prefix to the location name "Miami." Similarly, "area" may be used as a postfix unigram to imply an increased likelihood of a location name. For example, in the text " . . . found in the Seattle area . . . ," the single term "area" is a postfix to the location name "Seattle."

A bigram involves a double word neighboring the term in question. For example, "arrive in" may be a prefix bigram to a location word, such as in the text, " . . . they will arrive in London this afternoon . . . ." Similarly, "from where" may be a postfix bigram to a location word, such as in the text, " . . . a great view of Seattle from where I was . . . ." Lastly, a combined prefix and postfix bigram may split the bigram around the location name. For example, the combined bigram "from . . . to" may sandwich around a location name such as with, " . . . flew from New York to the final destination . . . ."

Figure 3:
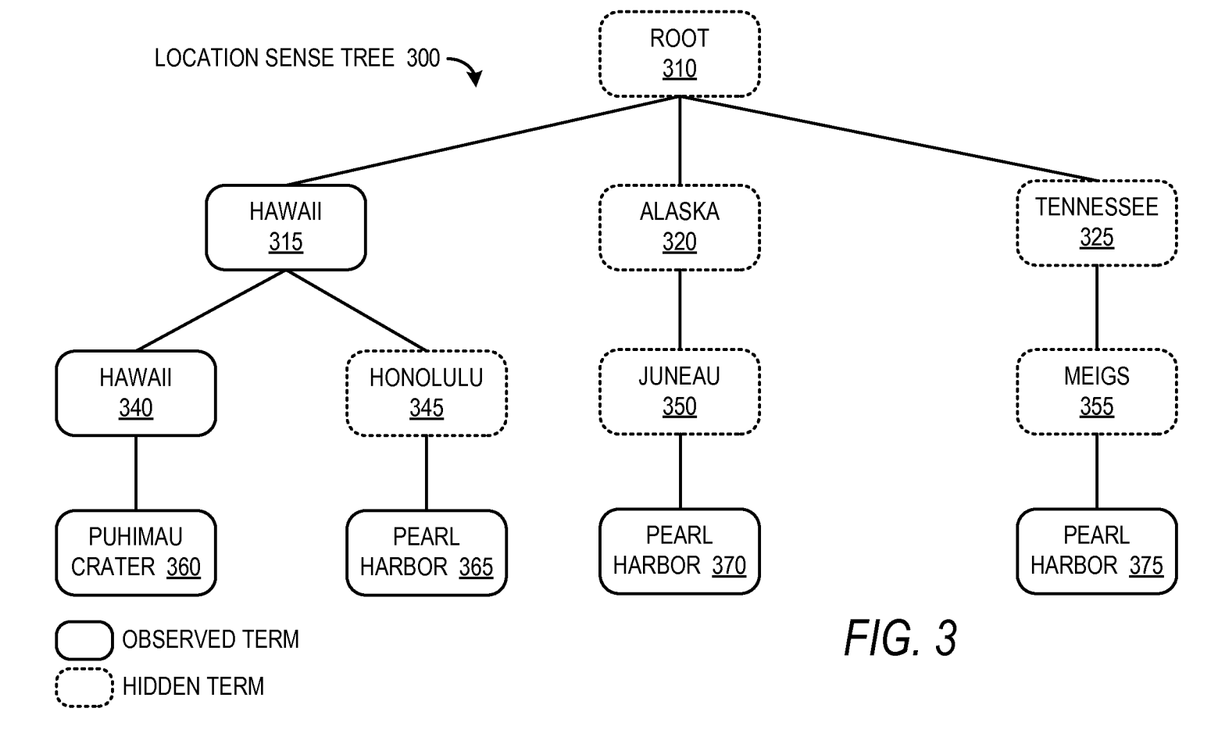
FIG. 3 is a data relationship diagram illustrating a location sense tree according to various embodiments presented herein.

Referring now to FIG. 3, a data relationship diagram illustrates a location sense tree 300 according to various embodiments presented herein. The location name identification module 110 can organize observed terms ("Hawaii" at tree nodes 315, 340, "Puhimau Crater" at tree node 360, and "Pearl Harbor" at tree nodes 365, 370, 375) along with hidden terms (root node 310, "Alaska" at tree node 320, "Tennessee" at tree node 325, "Honolulu" at tree node 345, "Juneau" at tree node 350, and "Meigs" at tree node 355) into a location sense tree 300. In this example, there are three location sense candidates for "Pearl Harbor" as found within the gazetteer 120. The three location senses are "Hawaii/Honolulu/Pearl Harbor," "Alaska/Juneau/Pearl Harbor," and "Tennessee/Meigs/Pearl Harbor." It may be quite difficult to identify the correct location sense referred to by "Pearl Habor" using only the single term by itself. However, the additional observation of "Puhimau Crater" within the document relates to a location in Hawaii and thus implies a high likelihood to the "Hawaii/Honolulu" sense of Pearl Harbor.

The determined unique location sense of each observed location name and its relevance score from location detection 210 and location recognition 220 can imply the hidden location senses and their corresponding relevance scores. The location name identification module 110 can implement score propagation based disambiguation of location names. Location disambiguation can determine which location name is the intended context within a given document. Each location name can be assigned a unique location sense in a given document. Intuitively, the location name "New York" may sound more like a geographic location than the location name "Flamingo."

In order to measure these ambiguities quantitatively and solve the location disambiguation task, a probability based method may be used. $P_{loc}$ may be used to represent the probability of a location name being an intended location. Suppose a location name X has k location senses given as $X_1, \ldots, X_k$. Then $P_{sense}(X_i)$ gives the probability of location X having the location sense $X_i$. If location X only has one location sense $X_i$, then $P_{sense}(X_i)$ will be 1.

Once $P_{loc}$ is determined for each location name and $P_{sense}$ is determined for each location sense, a score propagation algorithm may perform the location disambiguation for a given document. Suppose location names $X^1, \ldots, X^k$ have been extracted from a given document and the duplicate location names have been removed so that the location names are unique from each other in the sequence. Some location names have only one location sense but others may have multiply location senses. These location senses may be used to construct the location sense tree 300. The location sense tree 300 has a root node 310 and each node in the tree is a location sense. Each location sense has a unique location name but each location name may have many location senses. Where a location sense's location name is contained directly in the document, the location sense is said to be an observed location sense. A hidden location sense represents a location name that is not directly contained within the document. For example, given a location name sequence "Pearl Harbor, Puhimau Crater, Hawaii," the generated location sense sequence may be Hawaii/Honolulu/Pearl Harbor;
Alaska/Juneau/Pearl Harbor;
Tennessee/Meigs/Pearl Harbor;
Hawaii/Hawaii/Puhimau Crater;
Hawaii, and
Hawaii/Hawaii.

These location senses may be used to construct the location sense tree 300.

The observed location senses are illustrated in solid lines while the hidden location senses are illustrated in dotted lines. For example, the location sense Hawaii/Honolulu/Pearl Harbor is an observed location sense while the location sense Hawaii/Honolulu is a hidden location sense.

Each observed location sense has an initial score and can propagate its initial score to other location senses. Its initial score is proportional to its $P_{loc}$, its $P_{sense}$, and the number of times it appears in the given document according to the following expression:

$$s(X_p^q | D_i) = P_{loc}(X^q) P_{sense}(X_p^q) n(X^q | D_i)$$

where $P_{loc}(X^q)$ is the probability of $X^q$ being a location according to the corpus, $P_{sense}(X_p^q)$ is the probability of $X^q$ having location sense $X_p^q$ according to the corpus, and $n(X^q|D_i)$ is the number of times that $X^q$ appears within the document $D_i$.

After such initialization, the scores may be propagated through the location sense tree 300 such that the propagated score will decay as it travels along the branches of the tree. When a location sense propagates its score, closer location senses can receive more of the propagated score than further location senses. After the propagation process, the unique location sense of a location name in the given document can be the location sense of the location name that gets the highest score. In the illustrated example, the score propagation process can result in the location name Pearl Harbor having the unique location sense Hawaii/Hawaii/Pearl Harbor. The score propagation algorithm can be described formally using the following expressions:

$$S(X_t^k | D_i) = P_{sense}(X_t^k) \sum s(X_p^q | D_i) p^{d(X_t^k, X_p^q)}$$

$$\hat{X}^k = \arg\max_i S(X_i^k | D_i)$$

$$X_t^k \in A_i, X_p^q \in A_i$$

where p is a parameter defining a propagation factor and d( ) is a distance measuring function between the two nodes upon which it operates. Also $A_i$ is the set of observed location senses within the document $D_i$.

This score propagation algorithm can be implemented efficiently. Heuristic rules can be easily integrated into the propagation algorithm. The rules can be used to adjust $P_{loc}$ and $P_{sense}$ in a given document. Since $P_{loc}$ and $P_{sense}$ are computed from the corpus, they can represent the historical knowledge about the location names and location senses. Within a given document, some heuristic rules can be used to adjust $P_{loc}$ and $P_{sense}$. For example, if the pattern "the city of X" appears in the document, then $P_{loc}(X)$ can be set to one with respect to the given document. If the pattern "Central Park, New York, N.Y." appears in the document whereby the sense of Central Park is clear, then $P_{sense}$(New York/New York/Central Park) can be set to one and other location senses of Central Park may be removed from the location sense tree 300.

An iterative approach may be applied for computing $P_{loc}$. The conditional notation $c(X_k|D_i)$ may be used to represent the confidence of location name X to be a real geographic location if it has location sense $X_k$ in document $D_i$. Generally, $c(X_k|D_i)$ should be high when nearby location senses of location sense $X_k$ appear in the document $D_i$. The nearby location senses may be ancestral location senses or offspring location senses depending upon their relative positioning within the location sense tree 300. The value ω may be used to present a decay factor between generations within the tree. Thus, the follow expression may be used to compute $c(X_k|D_i)$ or the confidence of X being location sense $X_k$ given document $D_i$:

$$c(X_k | D_i) = \frac{1 + \sum \omega^{d(X_k, X_p^q)} + \sum \omega^{d(X_k, X_m^n)}}{1 + \sum \omega^{d(X_k, X_p^q)} + \sum \omega^{d(X_k, X_s^t)}}$$

where $X_p^q \in o'(X_k | D_i), X_m^n \in f'(X_k | D_i), X_s^t \in f(X_k | D_i)$ For the example illustrated in FIG. 3:

$$c(Hawaii | D_i) = \frac{1 + \omega + 2\omega^2}{1 + \omega + 2\omega^2} = 1$$

$$c(Hawaii/Hawaii | D_i) = \frac{1 + 2\omega}{1 + 2\omega} = 1$$

$$c(Alaska/Juneau/PearlHarbor | D_i) = \frac{1}{1 + \omega + \omega^2}$$

$$c(Hawaii/Honolulu/PearlHarbor | D_i) = \frac{1 + \omega^2}{1 + \omega + \omega^2}$$

The root node 310 may be excluded from the set $f(X_k|D_i)$ since all nodes are assumed to related to root node 310. Once $c(X_k|D_i)$ is computed, $P_{loc}(X_k|D_i)$ may be computed. The value for $P_{loc}(X_k|D_i)$ may be computed as the weighted sum of the confidence of location senses. $P_{loc}(X_k|D_i)$ and $P_{loc}$ can be computed as shown in the following expressions:

$$P_{sense}(X_k | D_i) = \frac{S(X_k | D_i)}{\sum_{t=1}^{a(X)} S(X_t | D_i)}$$

$$P_{loc}(X | D_i) = \sum_{k=1}^{a(X)} P_{sense}(X_k|D_i) c(X_k|D_i)$$

$$P_{loc}(X) = \frac{\sum_{i=1}^{N} I(X|D_i) P_{loc}(X|D_i)}{\sum_{i=1}^{N} I(X | D_i)}$$

Here it is shown that $P_{loc}$ relies on $P_{sense}$. It will also be shown that $P_{sense}$ may rely upon $P_{loc}$. Thus, the iterative relationship between the computation of $P_{loc}$ and $P_{sense}$. $P_{loc}$ may be initialized to a default initial value. If a location name X is not observed within the corpus, then $P_{loc}(X)$ will take on this initial value. An example default value may be 0.1 or any other specified value.

Similar to the score propagation technique, an iterative approach may be applied for computing $P_{sense}$. After initializing $P_{sense}(X_k)$ to $1/a(X)$, the values for $P_{sense}$ may be computed iteratively according to the following expressions:

$$S(Y_t^k | D_i) = P_{sense}(Y_t^k) \sum s(X_p^q | D_i) p^{d(Y_t^k, X_p^q)}$$

where $X_p^q \in A_i, Y_t^k \in C_i$ $$s(X_p^q|D_i) = P_{loc}(X^q) P_{sense}(X_p^q) n(X^q|D_i)$$

$$S(Y_t^k) = \sum_{i=1}^{N} I(Y_k | D_i) S(Y_t^k | D_i)$$

$$P_{sense}(Y_t^k) = \frac{S(Y_t^k)}{\sum_{j=1}^{a(Y^k)} S(Y_j^k)}$$

After the location disambiguation phase, each location name within a document can be associated with a unique location sense. These unique location senses may be used to construct an updated location sense tree 300 where the ambiguous location senses have been removed. This updated tree may be referred to as a disambiguated tree. A measure of the relevance of a location sense to a given document can support search indexing. Observed location names may be highly correlative and their hierarchical relationships can imply useful measures of term to document relevance. A bottom-up propagation algorithm may be used to perform a computation of accurate relevance between a location name (term) and a particular document. An initial score for each location sense in the disambiguated tree may be given by the expression:

$$s(\hat{X}^*|D_i) = P_{sense}(\hat{X}^*|D_i) P_{loc}(X^*) c(\hat{X}^*|D_i) n(X^*D_i)$$

A normalized score may be computed from the initial scores according to the following expression:

$$s'(\hat{X}^k|D_i) = \frac{s(\hat{X}^k|D_i)}{\sum s(\hat{X}^k|D_i)}$$

A location sense can have score contributions from each of its offspring location senses. An offspring location sense can propagate a portion of its normalized initial score to the location sense in question. Following this bottom-up propagation from offspring, the final score of each location sense in the disambiguated tree may be computed from the following expression:

$$S(\hat{X}^*|D_i) = s'(\hat{X}^*|D_i) + \Sigma s'(\hat{Y}^t|D_i) p^{d(\hat{X}^k, \hat{Y}^t)}$$

where $Y^t$ is one of the offspring location senses to $X^k$.

Figure 4:
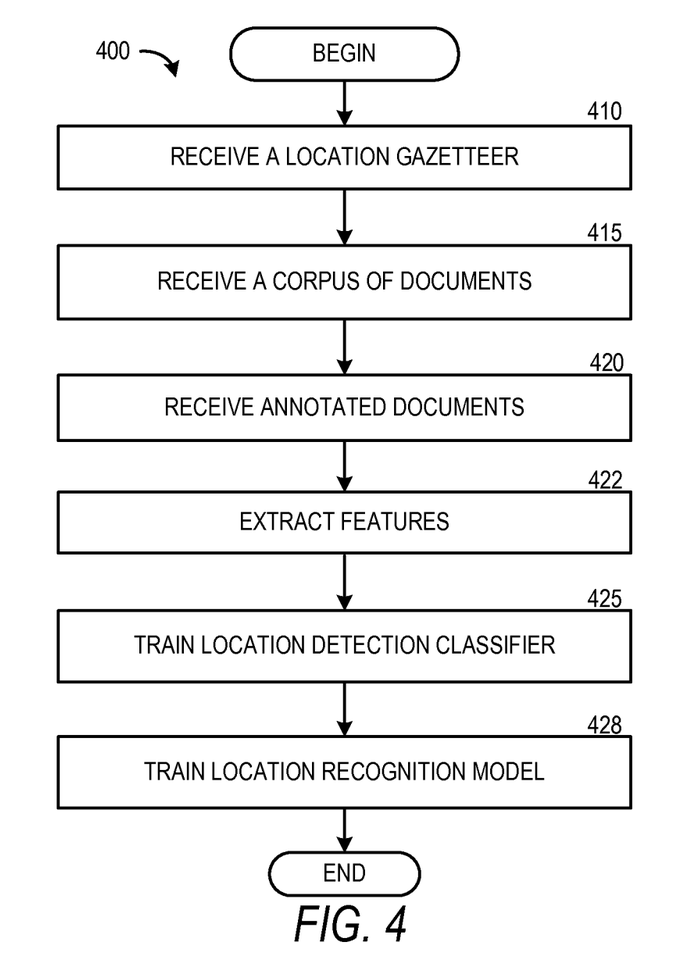
FIG. 4 is a flow diagram showing aspects of one process presented herein for training identifiers of location names according to one embodiment presented herein.

Referring now to FIG. 4, additional details will be provided regarding the embodiments presented herein for identifying location names within document text. In particular, FIG. 4 is a flow diagram showing a routine 400 that illustrates aspects of one process presented herein for training identifiers of location names.

It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 410, where the location name identification module 110 can receive a location gazetteer 120. The gazetteer 120 may be considered a geographical directory or dictionary. Each location name within the gazetteer 120 may have one or more location senses. A sense for a term may be considered a possible meaning or context for the term. The location senses may be listed in a hierarchical fashion.

At operation 415, the location name identification module 110 can receive a corpus of documents. The corpus, or body, of documents can define a search space for establishing a search index over. Statistics may be computed from the corpus. These statistics can include location names and location senses within the documents of the corpus. The location names and location senses may be determined from the location gazetteer 120 received at operation 410.

At operation 420, the location name identification module 110 can receive a set of annotated documents. The annotated documents may be used for training the detection classifier and/or the recognition model. The annotations may have been manually applied as labels of the location sense for each possible location word in each of the annotated documents.

At operation 422, the location name identification module 110 can extract features. Feature extraction may be performed using a variety of techniques discussed herein. For example, feature extraction may leverage bigram statistics computed from the annotated documents, location prior statistics and location sense prior statistics computed from documents.

Feature extraction may also leverage popularity metrics from other information contexts. For example, location tags on photos within an online photo sharing system are significantly more numerous for "Paris, France" than for "Paris, Ill." This statistical information can serve as a proxy for the likelihood that a document containing the term "Paris" is related to France instead of being related to Illinois. Thus, the number of photo entries for a location sense is in direct proportion to the location sense prior statistic.

Feature extraction may also leverage relevance scores propagated among location senses within a document. These relevance scores can establish how relevant the location sense or location name is to each document. The relevance score may be used to establish search indices for the document Feature extraction may also leverage location sense hierarchies for the documents. Candidate locations names within a document may be related according to the possible location senses for each location name. The location senses may be determined from the location gazetteer 120 received at operation 410.

Feature extraction may also leverage heuristic clues to detection and recognition. Using unigrams, bigrams, outside indicators, and various other heuristic clues, the accuracy of location detection 210 and location recognition 220 may be improved.

At operation 425, the location name identification module 110 can train a classifier for location name detection. Training of the location name detection classifier may be based on the annotated documents and the various extracted information. Training of the location name detection classifier may use a SVM learning algorithm.

At operation 428, the location name identification module 110 can train a model for location sense recognition. Training of the location sense recognition model may be based on the annotated documents and the various extracted information. Training of the location sense recognition model may use a ranked SVM algorithm. The routine 400 can terminate after operation 428.

Figure 5:
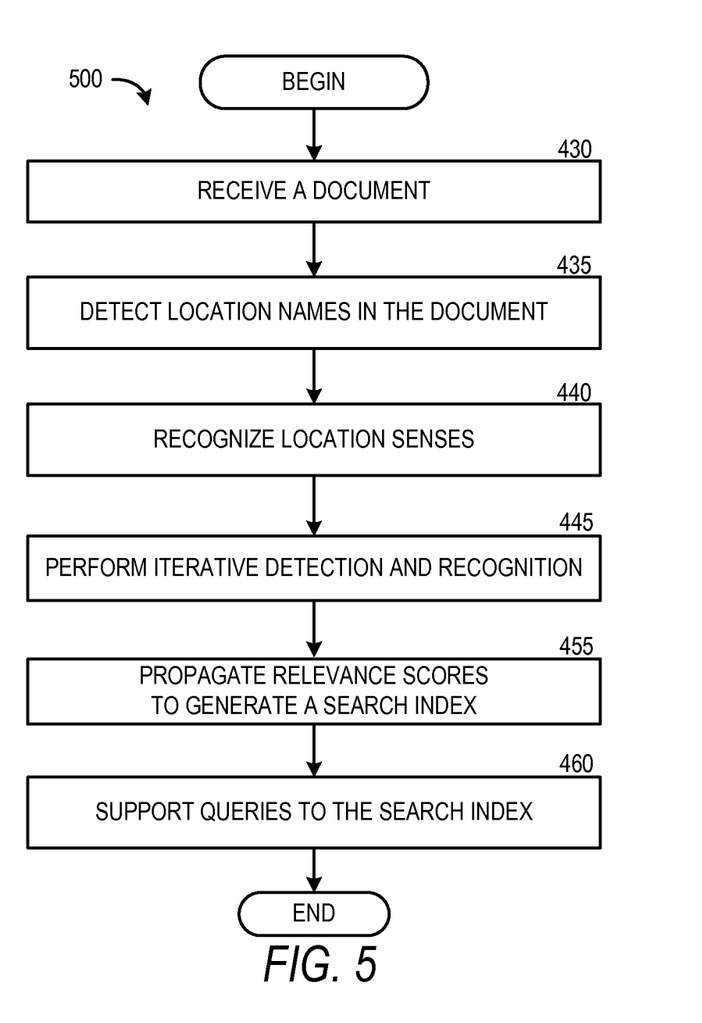
FIG. 5 is a flow diagram showing aspects of one process presented herein for detection and recognition of location names according to one embodiment presented herein.

Referring now to FIG. 5, additional details will be provided regarding the embodiments presented herein for identifying location names within document text. In particular, FIG. 5 is a flow diagram showing a routine 500 that illustrates aspects of one process presented herein for detection and recognition of location names.

The routine 500 begins at operation 430, where the location name identification module 110 can receive a document. The document may be from the corpus or the received document may be a new document for indexing.

At operation 435, the location name identification module 110 can detect location names in the document. Location detection 210 can attempt to disambiguate location names from common words. Location detection 210 may be viewed as a binary detection problem wherein every term in the document is detected to be either a location name or a common word.

At operation 440, the location name identification module 110 can recognize location senses of the identified location names. Location recognition 220 can attempt to disambiguate multiple location sense from a location name. For example, the term "Venice" may be disambiguated between a city in Italy, California, or Florida. Location recognition 220 may be viewed as a ranking problem wherein each possible location sense for a given location word is ranked according to its likelihood for being the actual intended location sense of the document's author.

At operation 445, the location name identification module 110 can perform iterative detection and recognition. Because of the interdependence of location detection 210 and location recognition 220, the outcomes for each may be initialized to a specified value and then an iterative approach may be applied to achieve location detection 210 and location recognition 220 together with assistance from one another.

At operation 455, the location name identification module 110 can propagate relevance scores to generate a search index 140. Once the location name and location sense disambiguation is completed, relevance scores may be propagated among the remaining location senses within a document. These relevance scores can establish how relevant the location sense or location name is to the document. The relevance score may be used to establish search indices for the document.

At operation 460, the location name identification module 110 can support queries 150 to the search index 140. A location query 150 can identify which, if any, of the documents 130 contain, or relate to, a location name according to the search index 140. The location query 150 may originate from a user, a search engine, any other software module, or any information retrieval mechanism. The routine 500 can terminate after operation 460.

Figure 6:
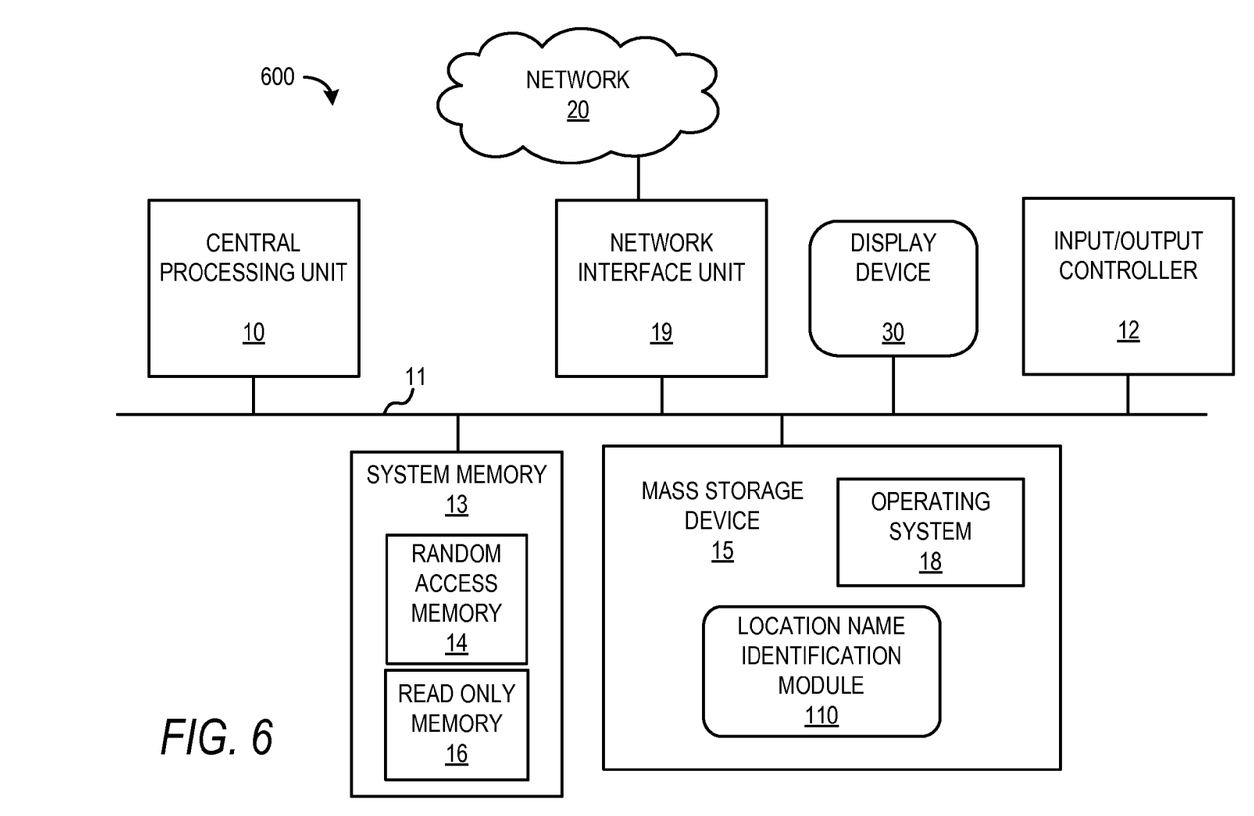
FIG. 6 is a computer architecture diagram showing an illustrative computer hardware and software architecture for a computing system capable of implementing aspects of the embodiments presented herein.

Turning now to FIG. 6, an illustrative computer architecture 600 can execute software components described herein for identifying location names within document text. The computer architecture shown in FIG. 6 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise. The computer architecture 600 may apply to the computer executing the program modules associated with the identification of location names within document text.

The computer architecture illustrated in FIG. 6 can include a central processing unit 10 (CPU), a system memory 13, including a random access memory 14 (RAM) and a read-only memory 16 (ROM), and a system bus 11 that can couple the system memory 13 to the CPU 10. The system memory 13 may provide memory used for the location name identification module 110. A basic input/output system containing the basic routines that help to transfer information between elements within the computer 400, such as during startup, can be stored in the ROM 16. The computer 600 may further include a mass storage device 15 for storing an operating system 18, software, data, and various program modules, such as those associated with the location name identification module 110. The program modules can execute portions of software components, processes, and routines described herein.

The mass storage device 15 can be connected to the CPU 10 through a mass storage controller (not illustrated) connected to the bus 11. The mass storage device 15 and its associated computer-readable media can provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 20. The computer 600 may connect to the network 20 through a network interface unit 19 connected to the bus 11. It should be appreciated that the network interface unit 19 may also be utilized to connect to other types of networks and remote computer systems. The computer 600 may also include an input/output controller 12 for receiving and processing input from a number of other devices, including a keyboard, mouse, or electronic stylus (not illustrated). Similarly, an input/output controller 12 may provide output to, a printer, or other type of output device (also not illustrated). A display device 30 may be used for providing output from the computer 600 in the form of text, graphics, video, graphical user interface, any other user interface elements, or any combination thereof.

As mentioned briefly above, a number of program modules and data files may be stored in the mass storage device 15 and RAM 14 of the computer 600, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the program modules associated with the location name identification module 110 for execution by the CPU 10. The mass storage device 15, the ROM 16, and the RAM 14 may also store other types of program modules.

In general, software applications or modules such as those associated with the location name identification module 110 may, when loaded into the CPU 10 and executed, transform the CPU 10 and the overall computer 600 from general-purpose computing systems into special-purpose computing systems customized to perform location name identification. The CPU 10 may be constructed from any number of transistors or other discrete circuit elements, which may individually or collectively assume any number of states. More specifically, the CPU 10 may operate as one or more finite-state machines, in response to executable instructions contained within the software or modules. These computer-executable instructions may transform the CPU 10 by specifying how the CPU 10 transitions between states, thereby physically transforming the transistors or other discrete hardware elements constituting the CPU 10.

Encoding the software or modules onto the mass storage device 15 may also transform the physical structure of the mass storage device 15 or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for location name identification within document text are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for location name identification within document text, the computer-implemented method comprising performing computer-implemented operations for:
receiving a document;
detecting location names in the document;
recognizing location senses of the detected location names, wherein the location senses comprise a possible meaning or context for each location name;
organizing the recognized location senses together in a location sense hierarchy for the document comprising a location sense tree including observed location senses corresponding to location names detected within the document, and hidden location senses corresponding to location names not detected within the document but associated with the detected location names;
performing the detection of location names and the recognition of location senses iteratively;
determining a probability of each location name being an intended location, and determining a probability of each location name having a particular location sense;
generating an initial relevance score for each observed location sense based on the probability of each location name being the intended location, a number of times the observed location sense appears in the given document; and
generating a search index by propagating the relevance scores based on the initial relevance scores through the location sense tree such that the propagated relevance scores decay as they travel along branches of the location sense tree.

2. The computer-implemented method of claim 1, wherein the detection of location names and the recognition of location senses is initialized using statistics derived from a corpus of documents.

3. The computer-implemented method of claim 1, wherein the search index associates a relevance of location senses to the document.

4. The computer-implemented method of claim 1, further comprising applying heuristic clues to the detection of location names and the recognition of location senses.

5. The computer-implemented method of claim 1, wherein the detection of location names comprises disambiguation of location names from common words.

6. The computer-implemented method of claim 1, wherein the recognition of location senses comprises disambiguation of multiple location senses associated with a location name.

7. One of an optical, magnetic or solid state storage device having computer-readable instructions stored thereupon which, when executed by a computer, cause the computer to:
receive a document;
detect location names in the document;
recognize location senses of the detected location names, wherein the location senses comprise a possible meaning or context for each location name;
organize the recognized location senses together in a location sense hierarchy for the document comprising a location sense tree including observed location senses corresponding to location names detected within the document, and hidden location senses corresponding to location names not detected within the document but associated with the detected location names;
perform the detection of location names and the recognition of location senses iteratively;
determine a probability of each location name being an intended location, and determining a probability of each location name having a particular location sense;
generate an initial relevance score for each observed location sense based on the probability of each location name being the intended location, the probability of each location name having the particular location sense, and a number of times the observed location sense appears in the given document; and
generate a search index by propagating the relevance scores based on the initial relevance scores through the location sense tree such that the propagated relevance scores decay as they travel along branches of the location sense tree.

8. The one of an optical, magnetic or solid state storage device of claim 7, wherein the detection of location names and the recognition of location senses is initialized using statistics derived from a corpus of documents.

9. The one of an optical, magnetic or solid state storage device of claim 7, wherein the computer is further caused to apply heuristic clues to the detection of location names and the recognition of location senses.

10. The one of an optical, magnetic or solid state storage device of claim 7, wherein the detection of location names comprises disambiguation of location names from common words.

11. The one of an optical, magnetic or solid state storage device of claim 7, wherein the recognition of location senses comprises disambiguation of multiple location senses associated with a location name.

12. The one of an optical, magnetic or solid state storage device of claim 7, wherein the search index associates the relevance of location senses to the document.

13. A computer-implemented method for location name identification within document text, the computer-implemented method comprising performing computer-implemented operations for:

receiving a corpus;

receiving a document;

detecting location names, as identified from the corpus, in the document;

recognizing location senses, as identified from the corpus, of the detected location names, wherein the location senses comprise a possible meaning or context for each location name;

organizing the recognized location senses together in a location sense hierarchy for the document comprising a location sense tree including observed location senses corresponding to location names detected within the document, and hidden location senses corresponding to location names not detected within the document but associated with the detected location names;

performing the detection of location names and the recognition of location senses iteratively;

determining a probability of each location name being an intended location, and determining a probability of each location name having a particular location sense;

generating an initial relevance score for each observed location sense based on the probability of each location name being the intended location, the probability of each location name having the particular location sense, and a number of times the observed location sense appears in the given document; and generating a search index by propagating the relevance scores based on the initial relevance scores through the location sense tree such that the propagated relevance scores decay as they travel along branches of the location sense tree.

* * * * *